Jan. 20, 1959 T. N. RATHJEN 2,869,602
MEAT GRINDER
Filed Oct. 28, 1955
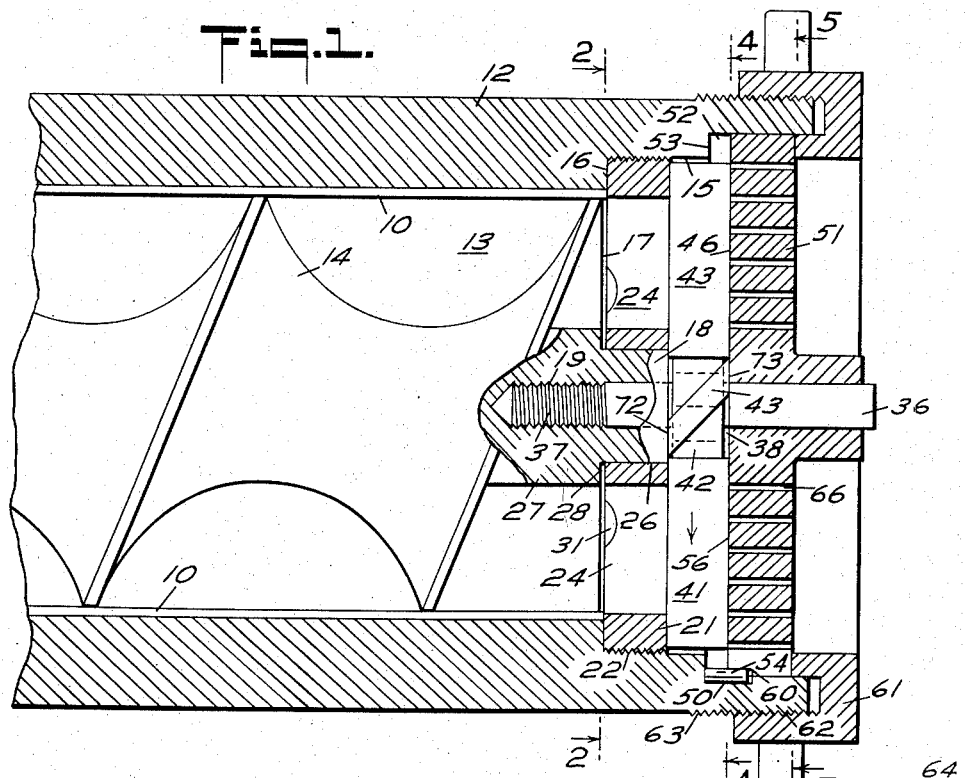
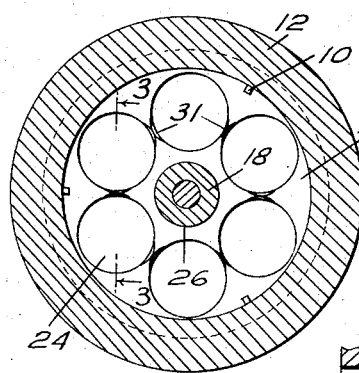
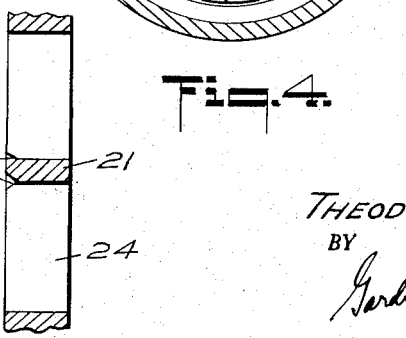
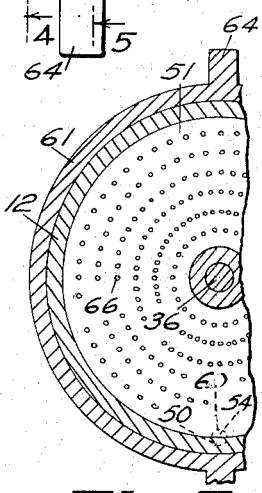
INVENTOR.
THEODORE N. RATHJEN
BY
ATTORNEYS United States Patent Office 2,869,602
Patented Jan. 20, 1959

2,869,602
MEAT GRINDER
Theodore N. Rathjen, Oakland, Calif.
Application October 28, 1955, Serial No. 543,392
1 Claim. (Cl. 146—189)

This invention generally relates to grinding apparatus, and is more particularly directed towards apparatus for comminuting chunks of meat into relatively small particles.

Meat grinders or choppers are widely used in the preparation of ground or chopped meat products, and while a large number of various types of such grinders have been marketed, there are certain inherent shortcomings present in such prior art devices which are intended to be overcome by the apparatus of the present invention.

Some of the commonly found difficulties in these existing devices include the failure of the apparatus to properly chop or grind the meat chunks, the presence of forces resulting in the meat moving rearwardly instead of forwardly and through the discharge apertures, etc.

Accordingly, it is an object of the present invention to provide a meat grinder in which means are provided for insuring a smooth forward travel of the meat without any rearward pressure being applied to the feed screw or the support therefor when the plates and knives are tightened into operative position.

A further object of my invention is to provide apparatus of the character described in which the cutter blades are positioned between a pair of stationary apertured plates whereby the meat will be subjected to a double shearing or grinding action in passing through the apertures in said plates.

Another object of this invention is to provide a meat grinder in which the meat, due to its uniform forward movement through the grinder, is subjected to less frictional forces, and consequently has a desired minimum temperature rise.

Another object of the invention is to provide a meat grinder in which a novel knife or cutter arrangement is used whereby the meat is properly shaved and comminuted as it passes the knife structure while at the same time insures continued forward movement of the product towards and through the discharge apertures.

Yet another object of the invention is to provide a meat grinder including a knife as above described in which the axial thrust of the knife is in no way transmitted against the normal movement of the feed screw, thereby permitting the use of less powerful and more economical actuating forces for rotating the screw.

A still further object of the invention is to provide apparatus of the character described in which the position of the knife relative to its adjacent parts may be maintained at an optimum position, notwithstanding wear and tear on various parts of the mechanism.

Yet another object of the invention is to provide a meat grinder of the type described which is relatively simple in construction and operation and which may be readily disassembled for cleaning without danger of failure to replace the parts in their proper operating position.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a longitudinal cross-sectional view of the discharge end portion of a meat grinder constructed in accordance with the present invention.

Figure 2 is a transverse cross-sectional view on a reduced scale of the rear plate taken substantially in the plane indicated by the line 2—2 of Figure 1.

Figure 3 is a cross-sectional view taken substantially in the plane indicated by line 3—3 of Figure 2, but drawn on a larger scale than Figure 2.

Figure 4 is a transverse cross-sectional view on a reduced scale of the knife, the plane of the view being substantially along the line 4—4 of Figure 1.

Figure 5 is a transverse cross-sectional view of the front plate, the plane of the view being substantially indicated by the line 5—5 of Figure 1.

As in the case with conventional meat grinders, the present apparatus is designed to receive a quantity of meat chunks, move the same along the length of the apparatus such as by a feed screw, and then utilize a combination of a knife and a pair of apertured plates to chop or grind the meat and extrude the same through the plate apertures. The foregoing, except for the plurality of plates, is generally illustrative and descriptive of all meat grinders, and the particular structural combination which permits the achievement of the hereinabove mentioned objects and features of advantage will be discussed in connection with a detailed description of the apparatus.

Referring first to Figure 1 of the drawing, a cylindrical casing 12 is provided which is shown in a horizontally disposed position. Within the bore 13 of the casing I provide a conventional helical feed screw 14 arranged to rotate about the axis of the casing through any conventional drive means. As is typical with such construction, by placing the meat chunks at the left end of the apparatus as shown in Figure 1, the screw 14 will cause the chunks to be moved axially and to the right as shown in the figure for engagement with the actual grinding portions of the mechanism, and more specifically will force the meat against the rear plate, presently to be described. To permit the meat to move along the bore 13, the latter should be provided with ribs or fluting 10 extending longitudinally of the bore.

The casing 12 is provided wtih a radially enlarged counterbore 15 in axial alignment with the main bore 13 so as to define a transverse shoulder 16 at the juncture of the two bores. The forward end of the screw 14, as indicated at 17, terminates just rearwardly of the shoulder 16 but is provided with an axial extension 18 having internal threads 19 at the rear end thereof for a purpose presently to be explained.

Disposed within the bore 15 is a stationary rear disk or plate member 21 which is maintained in position against the shoulder 16, and thus in predetermined relationship to the front end 17 of the feed screw. This is accomplished by means of threads 22 provided in the bore 15 and engageable by corresponding threads on the peripheral edge surface of the plate or disk 21. It is important to note that if the feed screw 14 is right-handed, the threads 22 will be left handed, so that the plate 21 will not be loosened by the forces created by the feed screw. As will be seen in Figures 1, 2 and 3, plate 21 is provided with a plurality of relatively large apertures 24 arranged circumferentially of the disk and covering the major portion of the area thereof. It will thus be understood that as the meat passes from the screw 14 the same will be forced into these apertures and as they are of a relatively large size, little resistance will be made to the axial passage of the meat chunks therethrough. The plate 21 is likewise provided with a central bore 26 which is slidably engaged with the extension 18 of the feed screw so as to permit relative rotation therebetween, and preferably such extension is of a smaller diameter than the internally threaded portion 27 of the screw so as to define a shoulder 28 spaced axially rearwardly of shoulder 16 to provide clearance between the rear surface of plate 21 and the front end 17 of the rotating feed screw. With particular reference to Figure 3 it will be noted that the adjacent peripheral portions of the apertures 24 are chamfered as indicated at 31 so as to substantially define a knife edge, on the rear side thereof, so that the meat will more easily enter into the apertures 24.

An axial shaft 36 is provided with a threaded end portion 37 which is engageable through the screw extension 18 with the threads 19 of the extension portion 27. This shaft is provided with a central shank portion 38 of square or other than circular external configuration. As the shaft is fixed to the screw by means of the threaded connection, obviously the rotation of the screw will impart similar rotation to the shaft and to any parts carried thereon.

Carried on the shank or squared portion 38 of the shaft is a cutting knife 41, such knife having a central hub portion 42 provided with a suitable aperture for engagement with the shaft shank so that the knife will rotate with the shaft 36 and feed screw. The knife includes a plurality of blades 43, here shown as four in number, although any suitable manner of blades could be utilized. The particular configuration of the blades is of extreme importance for proper operation of the unit and will be described after a discussion of the final meat extrusion or front plate of the apparatus. However, at this time it might be appropriate to add that the rear edge of each blade is positioned adjacent the front surface of the rear plate 21 so that meat passing through the apertures 24 will be engaged by the blades for further operations.

Disposed forwardly of the front surface 46 of the blades is a stationary front plate 51, such plate fitting against the annular wall of a second counterbore 52 which is larger and in axial alignment with the counterbore 15, a shoulder 53 being defined by the bores 15 and 52. It will be observed that the rear surface 56 of plate 51 is spaced from the shoulder 53 so that such surface may be brought directly against the front shearing surface 46 of the blades irrespective of the axial positioning of the latter due to wear or the like. The front plate may be moved into position against the knife surface 56 by means of a ring 61 which is provided with a threaded portion 62 engageable with an externally threaded portion 63 of the casing. Suitable lugs 64 may be provided on the ring for engagement with a suitable tool for clamping the ring in position or releasing the same for disassembly of the apparatus. To prevent rotation of plate 51, there may be provided a semicircular slot 50 in the casing for receiving a pin 54, a corresponding slot 60 in the plate embracing the complementary pin portion.

The front plate 51 is provided with a large number of apertures 66 through which the meat must necessarily pass in being extruded from the front end of the grinder. These apertures are arranged to receive the meat from the knife blades and in this connection the blades are so constructed so that the meat is forced toward such apertures during rotation of the knife. The blades may be straight or curved but it will be noted the leading edges 71 of the individual blades are slanted so that when the knife is rotating in the direction of the arrow in Figure 1 the portion of the knife adjacent the rear plate 21 will first engage the meat and then the meat is caused to travel along the sloping edges 71 in the direction of rotation until it is forced against the rear surface 46 of the front plate 51. The rear surfaces 72 of the blades are relatively straight as are the front surfaces 46 so that actually a shearing effect is created by the engagement of such portions against the opposed surfaces of the rear and front stationary plates. In this manner, the meat coming through the apertures 24 of the rear plate will be initially cut by engagement with the blade, will then be forced axially forwardly until it engages the rear surfaces of the front plate 51 and at such time the shearing action between the surfaces 46 and 56 of the knife and front plate respectively will result in the pieces of the meat being sheared and forced through the apertures 66 for discharge from the grinder. Thus, the transversely extending portions 72 and 46 of the knife blades are parallel to each other and to the opposed plate surfaces to result in the shearing action, while the leading edge 71 of the blade which slants in the direction of knife travel results in positive forward axial movement of the meat engaged thereby.

It is important to note that the knife, when in its operative position, may be merely clamped against the rear plate 21, and not against any portion of the feed screw itself. This results from having the blade surfaces 46 and 72 projecting beyond the transverse surfaces of the knife hub 42. This eliminates any back pressure against the feed screw and/or its thrust bearing (not shown) and therefore eliminates the heavy power requirement necessitated by many prior art grinders.

From the foregoing description it will be appreciated that while the apparatus of the present invention is neither complicated nor costly to construct or maintain, it presents a step forward in the art by insuring economical and efficient meat comminuting operation.

What is claimed is:

A meat grinder comprising a substantially cylindrical hollow body having a hollow bore and an axially disposed feed screw mounted therein, a front and a rear perforated plate each having a forward and rearward face, and a cutter member mounted therebetween, said feed screw including a forwardly disposed hub portion having an internally threaded axial bore therein, one end portion of said body having a plurality of successive increased bores, the innermost bore being internally threaded for at least half its overall length there being a reduced circumferential shoulder closely adjacent the innermost threads, an outermost bore being smooth and of greater diameter than the said innermost bore terminating in a circumferential shoulder parallel to said first mentioned shoulder and including front plate locking means therein, said means comprising a locking pin axially disposed in said smooth bore, the rear plate having a central hub receiving aperture therein for mounting said plate on said hub portion of the feed screw and a plurality of relatively large apertures therein, the adjacent peripheral edge portions of the apertures being chamfered so as to substantially define a knife edge thereon, the cutter member being disposed in said innermost bore and having a centrally disposed flat sided aperture therein and a plurality of obliquely disposed blade elements radiating outwardly therefrom, each blade having a pair of flat parallel side portions and a pair of flat parallel end portions, each of said cutter end portions being in face to face contact with the outer face of said rear plate and the inner face of said front plate, the front plate being disposed in said outermost bore parallel to said rear plate and cutter member and having a plurality of rings of small concentrically disposed spaced apertures and a centrally disposed shaft receiving aperture therein, said plate having a locking pin receiving groove in its peripheral surface, said blades being of a length so as to overlie the apertures in said rear plate and the outermost concentric ring of apertures in said front plate, an axially disposed supporting and aligning shaft having a threaded portion disposed at one end and a square shank cutter supporting portion disposed medially of said threaded end portion and the terminal end of the shaft, and being threadedly engaged in said threaded aperture in the feed screw, the cutter member being mounted on said square portion of the shaft and the front plate mounted in parallel abutting relationship therewith, said cylindrical body portion having exterior threads thereon and a locking ring member having a threaded interior surface engaging said body and a flange portion engaging the outer forward face of said frontplate locking the entire assembly in place.

References Cited in the file of this patent

UNITED STATES PATENTS

| | | |
|---|---|---|
| 419,103 | Baltzley | Jan. 7, 1890 |
| 431,230 | Leopold | July 1, 1890 |
| 756,713 | Sander | Apr. 5, 1904 |
| 820,990 | Sander | May 22, 1906 |
| 1,115,243 | Reid | Oct. 27, 1914 |
| 2,380,364 | Marshall | July 10, 1945 |

FOREIGN PATENTS

| | | |
|---|---|---|
| 463,853 | Germany | Aug. 6, 1928 |
| 146,162 | Austria | June 10, 1936 |
| 1,093,751 | France | Nov. 24, 1954 |